United States Patent
Ishikawa et al.

(10) Patent No.: US 12,129,815 B2
(45) Date of Patent: Oct. 29, 2024

(54) COMBUSTOR FOR ROCKET ENGINE

(71) Applicant: IHI Corporation, Tokyo (JP)

(72) Inventors: Yasuhiro Ishikawa, Tokyo (JP); Shinji Ishihara, Tokyo (JP); Hatsuo Mori, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/816,556

(22) Filed: Aug. 1, 2022

(65) Prior Publication Data
US 2022/0364529 A1 Nov. 17, 2022

Related U.S. Application Data

(63) Continuation of application No. PCT/JP2021/004584, filed on Feb. 8, 2021.

(30) Foreign Application Priority Data

Feb. 28, 2020 (JP) ................. 2020-033320

(51) Int. Cl.
*F02K 9/52* (2006.01)
*F02K 9/97* (2006.01)

(52) U.S. Cl.
CPC ............... *F02K 9/972* (2013.01); *F02K 9/52* (2013.01); *F05D 2240/35* (2013.01); *F05D 2260/2214* (2013.01); *F05D 2260/232* (2013.01); *F05D 2260/96* (2013.01)

(58) Field of Classification Search
CPC ........ F02K 9/52; F02K 9/972; F05D 2240/35; F05D 2260/232; F05D 2260/2214
See application file for complete search history.

(56) References Cited

U.S. PATENT DOCUMENTS

| 3,615,054 | A | * | 10/1971 | La Botz | ................... | F02K 9/52 |
| | | | | | | 239/557 |
| 6,908,298 | B1 | | 6/2005 | Dykema | | |
| 8,776,494 | B2 | * | 7/2014 | Carpenter | .............. | F02K 9/972 |
| | | | | | | 60/260 |
| 10,267,515 | B2 | * | 4/2019 | Adriany | .................. | F23D 14/22 |
| 2006/0144959 | A1 | | 7/2006 | Hewitt | | |
| 2010/0115917 | A1 | | 5/2010 | Laine | | |
| 2018/0087701 | A1 | | 3/2018 | Adriany et al. | | |
| 2019/0093602 | A1 | | 3/2019 | Black | | |
| 2020/0088138 | A1 | * | 3/2020 | Goetz | ..................... | F02K 9/972 |

FOREIGN PATENT DOCUMENTS

| JP | 1-249957 A | 10/1989 |
|----|------------|---------|
| JP | 9-68105 A | 3/1997 |
| JP | 2001-96738 A | 4/2001 |
| JP | 2010-525236 A | 7/2010 |
| JP | 2013-155655 A | 8/2013 |

* cited by examiner

*Primary Examiner* — Lorne E Meade
(74) *Attorney, Agent, or Firm* — Oblon, McClelland, Maier & Neustadt, L.L.P.

(57) ABSTRACT

The combustor for a rocket engine includes a combustion room configured to cause a combustion reaction between a fuel and an oxidant, an injector configured to inject the fuel and the oxidant into the combustion room, and a nozzle skirt configured to inject combustion gas generated by the combustion reaction to an outside, and an inertance increasing portion configured to increase an equivalent inertance in a vibration equivalent circuit of the combustor for the rocket engine.

5 Claims, 3 Drawing Sheets

COMBUSTOR FOR ROCKET ENGINE

This application is a Continuation Application based on International Application No. PCT/JP2021/004584, filed on Feb. 8, 2021, which claims priority on Japanese Patent Application No. 2020-033320, filed on Feb. 28, 2020, the contents of which are incorporated herein by reference.

TECHNICAL FIELD

The present disclosure relates to a combustor for a rocket engine.

BACKGROUND ART

The following Patent Document 1 discloses a thrust control apparatus and a thrust control method for a liquid rocket engine. The purpose of the thrust control apparatus and thrust control method is to reduce the possibility of generating low-frequency combustion vibration (chugging) caused by an extreme decrease in injection differential pressure (a difference between an injection pressure and a combustion pressure) when operating in a reduced thrust range by controlling a thrust to be reduced in the thrust control of a rocket engine. According to the thrust control apparatus and thrust control method, in a liquid rocket engine that injects a liquid propellant into a combustion room through an injection orifice, a temperature control means for controlling the temperature of the liquid propellant at an upstream side of the injection orifice is provided and the temperature of the liquid propellant is raised so as to secure an injection differential pressure needed for reduction control using a saturated vapor pressure of the liquid propellant when controlling the thrust of the engine to be reduced.

CITATION LIST

Patent Document

Patent Document 1

Japanese Unexamined Patent Application, First Publication No. 2013-155655

SUMMARY OF THE INVENTION

Technical Problem

From the viewpoint of suppressing vibration of a combustor for a rocket engine, in a liquid rocket engine described in Patent Document 1, vibration can be suppressed in a single thrust (operating point) by changing a shape of an injection orifice, but vibration cannot be suppressed in a plurality of thrusts. For example, unlike a disposable type, a combustor for a reusable rocket engine is used in a relatively wide thrust range for a landing operation and the like. Therefore, in the liquid rocket engine described in Patent Document 1, the vibration of the combustor for the reusable rocket engine cannot be effectively suppressed over an entire thrust range.

The present disclosure has been made in view of the above circumstances, and an object of the present disclosure is to provide a combustor for a rocket engine capable of effectively suppressing vibration when operating with a plurality of thrusts.

Solution to Problem

A combustor for a rocket engine according to a first aspect of the present disclosure includes a combustion room configured to cause a combustion reaction between a fuel and an oxidant, an injector configured to inject the fuel and the oxidant into the combustion room, a nozzle skirt configured to inject combustion gas generated by the combustion reaction to an outside, and an inertance increasing portion configured to increase an equivalent inertance in a vibration equivalent circuit of the combustor for the rocket engine.

The combustor for the rocket engine according to a second aspect of the present disclosure may further include, in the first aspect described above, a fuel passage configured to guide the fuel to the combustion room, and an oxidant passage configured to guide the oxidant to the combustion room, in which the inertance increasing portion increases the equivalent inertance by providing a plurality of branch portions in the fuel passage or/and the oxidant passage to lengthen a passage length thereof.

In the combustor for the rocket engine according to a third aspect of the present disclosure, in the second aspect described above, the inertance increasing portion may branch the fuel passage or/and the oxidant passage without changing a passage cross-sectional area in front of and behind the branch portion.

In the combustor for the rocket engine according to a fourth aspect of the present disclosure, in the second or third aspect described above, the fuel passage or/and the oxidant passage may include a cooling passage configured to cool the nozzle skirt, and in the inertance increasing portion, the plurality of branch portions are provided in front of the cooling passage.

In the combustor for the rocket engine according to a fifth aspect of the present disclosure, in the fourth aspect described above, the cooling passage may be provided from a base end to an end portion of the nozzle skirt and folded back at the end portion.

In the combustor for the rocket engine according to a sixth aspect of the present disclosure, in the fourth or fifth aspect described above, the cooling passage may be spirally provided with respect to the nozzle skirt.

According to the present disclosure, it is possible to provide a combustor for a rocket engine capable of effectively suppressing vibration when operating with a plurality of thrusts.

DETAILED DESCRIPTION OF THE EMBODIMENTS

Hereinafter, an embodiment of the present disclosure will be described with reference to the drawings.

A combustor C for a rocket engine according to the present embodiment is a combustor constituting a reusable rocket engine. That is, unlike a combustor for a disposable rocket in the related art, the combustor C for the rocket engine is a combustor that operates with a plurality of thrusts (operating points) in a wide range, that is, operates even with a thrust (low operating point) that is significantly lower than a normal thrust, in addition to the normal thrust (normal operating point).

Figure 1:
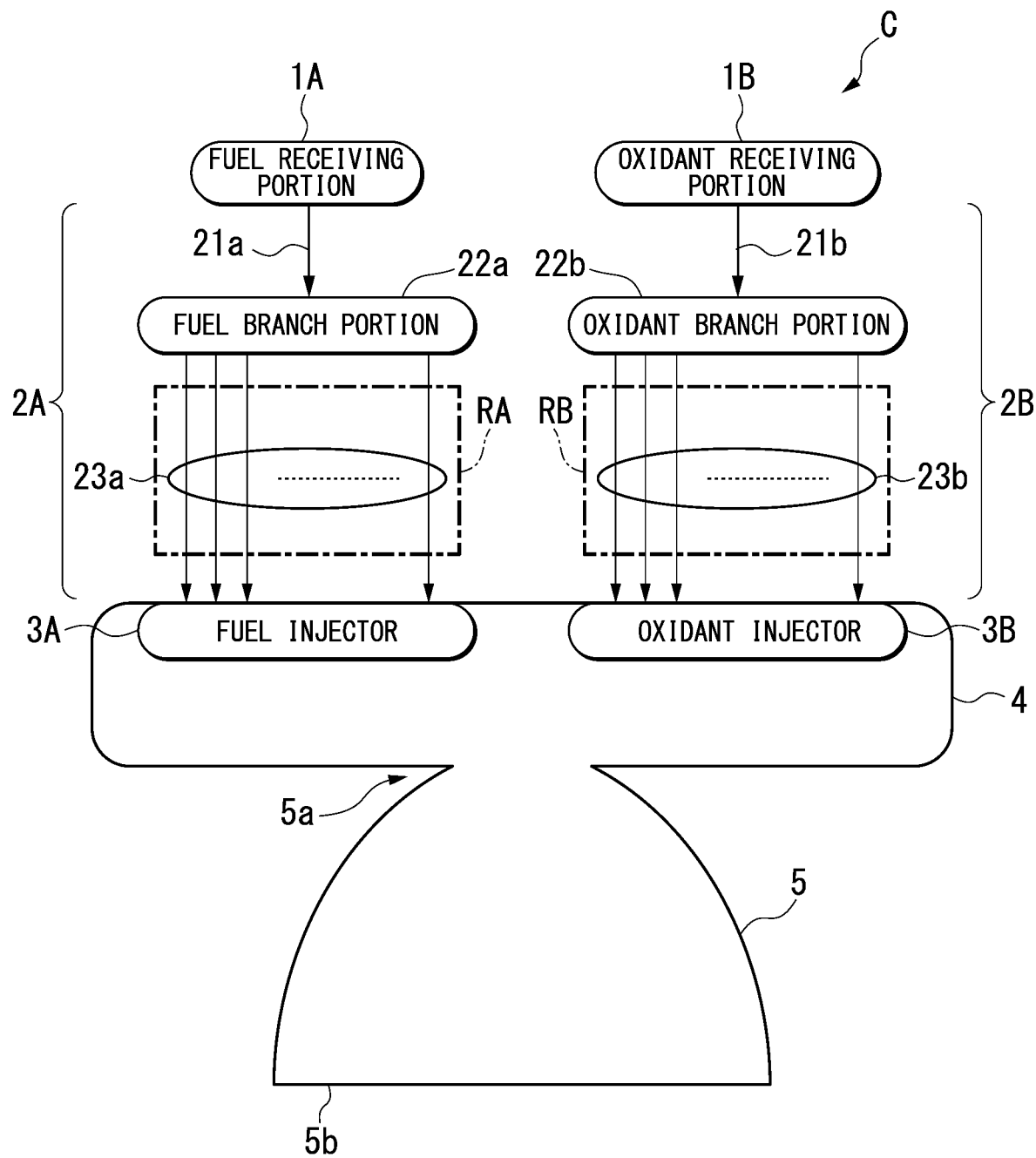
FIG. 1 is a schematic diagram showing a configuration of a combustor for a rocket engine according to an embodiment of the present disclosure.

As shown in FIG. 1, the combustor C for the rocket engine includes a fuel receiving portion 1A, an oxidant receiving portion 1B, a fuel passage 2A, an oxidant passage 2B, a fuel injector 3A, an oxidant injector 3B, a combustion chamber 4, and a nozzle skirt 5. Furthermore, the fuel passage 2A and the oxidant passage 2B in the present embodiment correspond to an inertance increasing portion of the present disclosure.

The fuel receiving portion 1A is a receiving port that receives a fuel from a fuel supply system. That is, the fuel receiving portion 1A is a receiving port that receives a liquid fuel at a predetermined pressure from the fuel supply system configured with a fuel tank, a fuel pump, and the like, and supplies the liquid fuel to the fuel passage 2A. The liquid fuel is, for example, liquid hydrogen or liquefied natural gas.

The oxidant receiving portion 1B is a receiving port for receiving an oxidant from an oxidant supply system. That is, the oxidant receiving portion 1B is a receiving port that receives an oxidant at a predetermined pressure from the oxidant supply system configured with an oxidant tank, an oxidant pump, and the like, and supplies the oxidant to the oxidant passage 2B. The oxidant is, for example, liquid oxygen.

The fuel passage 2A is a metal pipe that guides the liquid fuel supplied from the fuel supply system to the fuel injector 3A via the fuel receiving portion 1A. The fuel passage 2A includes a receiving pipe 21a, a fuel branch portion 22a, and a plurality of branch pipes 23a. The receiving pipe 21a is a single pipe connecting the fuel receiving portion 1A and the fuel branch portion 22a to each other to circulate the liquid fuel from the fuel receiving portion 1A to the fuel branch portion 22a.

Figure 2:
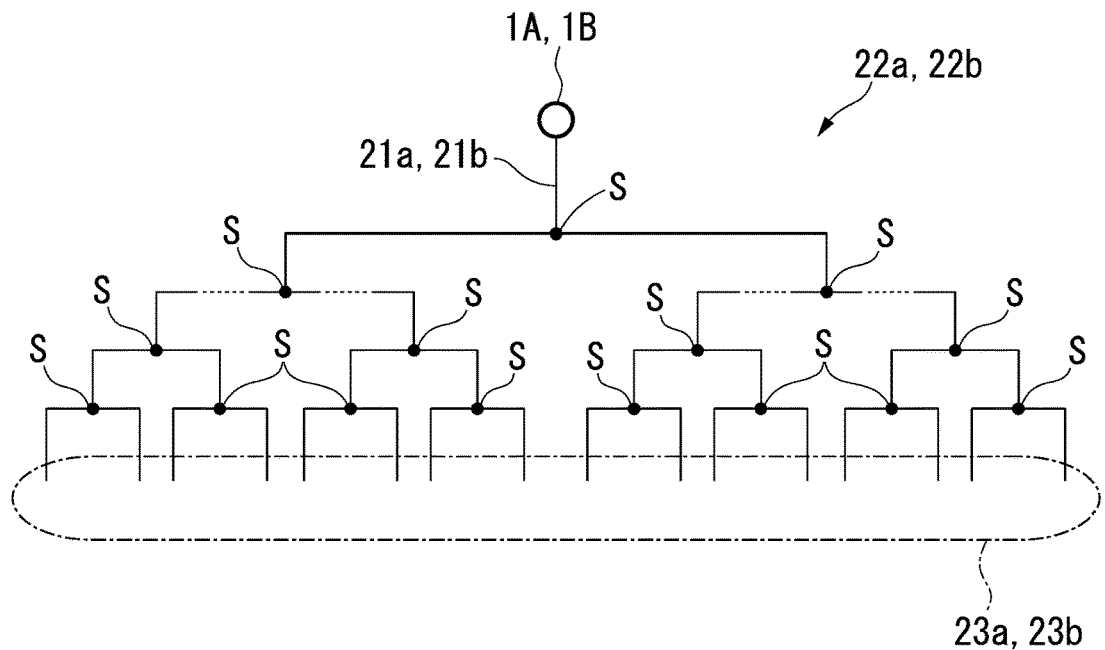
FIG. 2 is a schematic diagram showing details of a fuel branch portion and an oxidant branch portion in an embodiment of the present disclosure.

The fuel branch portion 22a is an aggregate of a plurality of branch portions S as shown in FIG. 2. That is, the fuel branch portion 22a, that is, the plurality of branch portions S in the fuel passage 2A, is to lengthen a pipe length (passage length) of the fuel passage 2A by sequentially branching the receiving pipe 21a (single passage), which is a single pipe. In addition, by branching the passage, an effect of creating a fine shower of liquid fuel suitable for combustion can be expected.

Here, a passage branching method in which a single passage is branched into a plurality of passages with a single branch portion S may be employed, but in the present embodiment as will be described later, an equivalent inertance L in a vibration equivalent circuit is increased by lengthening the pipe length (passage length) of the fuel passage 2A. Therefore, the fuel branch portion 22a employs a tournament-type branch form that increases the pipe length (passage length) of the fuel passage 2A, for example, by providing the plurality of branch portions S, and sequentially repeating branching into two passages at each branch portion S as shown in FIG. 2, without branching the passage into the plurality of passages at one location.

The fuel branch portion 22a distributes the liquid fuel flowing in from the receiving pipe 21a to the plurality of branch pipes 23a. The plurality of branch pipes 23a are pipes connected to the fuel branch portion 22a via the plurality of branch portions S. These branch pipes 23a guide the liquid fuel flowing in from the fuel branch portion 22a to the fuel injector 3A.

In addition, these branch pipes 23a constitute a cooling passage RA as shown in FIG. 1. The cooling passage RA is a pipe portion that contributes to cooling the combustion chamber 4 and the nozzle skirt 5. That is, the cooling passage RA (plurality of branch pipes 23a) is mechanically provided densely on a wall surface of the combustion chamber 4 and the nozzle skirt 5 so as to be adjacent to each other as shown in FIGS. 3A and 3B to cool the combustion chamber 4 and the nozzle skirt 5 by the liquid fuel circulating therein.

Figure 3A:
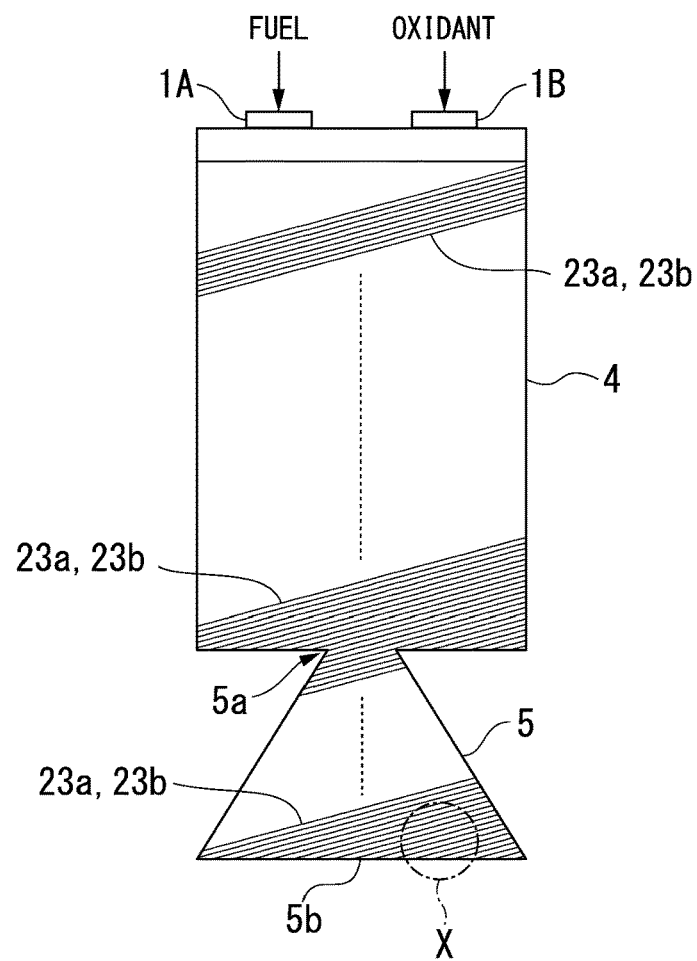
FIG. 3A is a view showing an arrangement of branch pipes in an embodiment of the present disclosure.

These branch pipes 23a are provided over an entire wall surface of the combustion chamber 4, and on a wall surface of the nozzle skirt 5 from a base end 5a (upper end) to an end portion 5b (lower end) as shown in FIG. 3A. That is, these branch pipes 23a are provided over an entire surface of the combustion chamber 4 and the nozzle skirt 5.

Figure 3B:
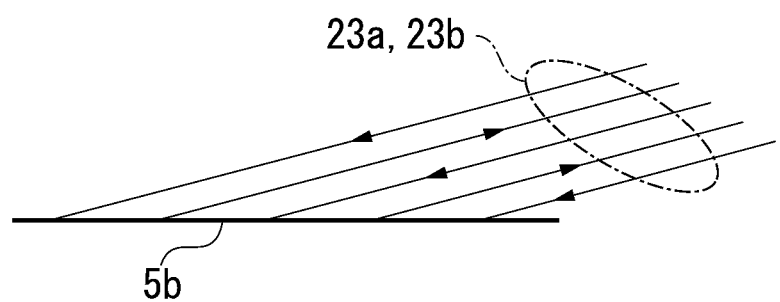
FIG. 3B is a partially enlarged view of branch pipes in an embodiment of the present disclosure.

In addition, these branch pipes 23a are spirally provided with respect to wall surfaces of the combustion chamber 4 and the nozzle skirt 5 and are folded back at the end portion 5b of the nozzle skirt 5, and the branch pipes 23a adjacent to each other are provided such that flow directions of the liquid fuel are opposite to each other as shown in FIG. 3B. That is, the plurality of branch pipes 23a are provided such that the liquid fuel flows in a spiral and reciprocating manner from an upper end of the combustion chamber 4 to the end portion 5b (lower end) of the nozzle skirt 5. Furthermore, the branch pipes 23a may not have a spiral shape as long as the required passage length of the fuel passage 2A can be obtained.

Here, a total cross-sectional area of the plurality of branch pipes 23a is equal to a cross-sectional area of the single receiving pipe 21a. That is, the fuel branch portion 22a (branch portion S) branches the fuel passage 2A without changing the passage cross-sectional area in front and behind.

In the fuel passage 2A configured in this manner, in addition to lengthening the pipe length (passage length) of the fuel passage 2A by the fuel branch portion 22a, the pipe length (passage length) of the fuel passage 2A is also lengthened by the plurality of branch pipes 23a. In the foregoing fuel passage 2A, since the passage length of the fuel passage through which the liquid fuel circulates is longer than that of a combustor for a rocket engine in the related art, the equivalent inertance L in the vibration equivalent circuit can be sufficiently increased.

The oxidant passage 2B is a metal pipe that guides the oxidant supplied from the oxidant supply system to the oxidant injector 3B via the oxidant receiving portion 1B. The oxidant passage 2B includes a receiving pipe 21b, an oxidant branch portion 22b, and a plurality of branch pipes 23b. The receiving pipe 21b is a single pipe connecting the oxidant receiving portion 1B and the oxidant branch portion 22b to each other to circulate the oxidant from the oxidant receiving portion 1B to the oxidant branch portion 22b.

The oxidant branch portion 22b is an aggregate of a plurality of branch portions S as shown in FIG. 2. The oxidant branch portion 22b, that is, the plurality of branch portions S in the oxidant passage 2B, is to lengthen a pipe length (passage length) of the oxidant passage 2B by sequentially branching the receiving pipe 21b (single passage), which is a single pipe.

As described above, in the present embodiment, an equivalent inertance is increased by lengthening the pipe length (passage length) of the oxidant passage 2B. Therefore, the oxidant branch portion 22b employs a branch form that increases the pipe length (passage length) of the oxidant passage 2B by providing the plurality of branch portions S, and sequentially repeating branching into two passages at each branch portion S as shown in FIG. 2, without branching the passage into the plurality of passages at one location.

The oxidant branch portion 22b distributes the oxidant flowing in from the receiving pipe 21b to the plurality of branch pipes 23b. The plurality of branch pipes 23b are pipes connected to the oxidant branch portion 22b via the plurality of branch portions S. These branch pipes 23b guide the oxidant flowing in from the oxidant branch portion 22b to the oxidant injector 3B.

In addition, these branch pipes 23b constitute a cooling passage RB as shown in FIG. 1. Similar to the cooling passage RA, the cooling passage RB is a pipe portion that contributes to cooling the combustion chamber 4 and the nozzle skirt 5. That is, the cooling passage RB (plurality of branch pipes 23b) is mechanically provided densely on a wall surface of the combustion chamber 4 and the nozzle skirt 5 so as to be adjacent to each other to cool the combustion chamber 4 and the nozzle skirt 5 by the oxidant circulating therein.

Similar to the branch pipes 23a of the fuel passage 2A, these branch pipes 23b are provided over an entire wall surface of the combustion chamber 4, and on a wall surface of the nozzle skirt 5 from a base end 5a (upper end) to an end portion 5b (lower end). That is, these branch pipes 23b are provided over an entire surface of the combustion chamber 4 and the nozzle skirt 5.

In addition, similar to the branch pipes 23a of the fuel passage 2A, these branch pipes 23b are spirally provided with respect to wall surfaces of the combustion chamber 4 and the nozzle skirt 5 and are folded back at the end portion 5b of the nozzle skirt 5, and the branch pipes 23b adjacent to each other are provided such that flow directions of the oxidant are opposite to each other as shown in FIG. 3B. That is, the plurality of branch pipes 23b are provided such that the oxidant flows in a spiral and reciprocating manner from an upper end of the combustion chamber 4 to the end portion 5b (lower end) of the nozzle skirt 5.

Here, a total cross-sectional area of the plurality of branch pipes 23b is equal to a cross-sectional area of the single receiving pipe 21b. That is, the oxidant branch portion 22b (branch portion S) branches the oxidant passage 2B without changing the passage cross-sectional area in front and behind.

In the oxidant passage 2B configured in this manner, in addition to lengthening the pipe length (passage length) of the oxidant passage 2B by the oxidant branch portion 22b, the pipe length (passage length) of the oxidant passage 2B is also lengthened by the plurality of branch pipes 23b. In the foregoing oxidant passage 2B, since the passage length of the oxidant passage through which the oxidant circulates is longer than that of a combustor for a rocket engine in the related art, the equivalent inertance L in the vibration equivalent circuit can be sufficiently increased.

The fuel injector 3A is a fuel injection nozzle provided near an end (upper end) of the combustion chamber 4 to inject liquid fuel flowing in from the fuel passage 2A into the combustion chamber 4. That is, the fuel injector 3A injects fuel into a combustion room, which is an internal space of the combustion chamber 4. The fuel injector 3A is provided for each of the plurality of branch pipes 23a, for example.

The oxidant injector 3B is an oxidant injection nozzle provided near an end (upper end) of the combustion chamber 4 to inject an oxidant flowing in from the oxidant passage 2B into the combustion chamber 4. That is, the oxidant injector 3B injects the oxidant into the combustion room, which is an internal space of the combustion chamber 4. The oxidant injector 3B is provided for each of the plurality of branch pipes 23b, for example.

The combustion chamber 4 is a hollow body including the above-mentioned combustion room as an internal space. The combustion chamber 4 burns the fuel injected from the fuel injector 3A using the oxidant injected from the oxidant injector 3B in the combustion room.

In the combustion room, high-temperature and high-pressure combustion gas is generated by a combustion reaction between the fuel and the oxidant. That is, the combustion chamber 4 needs to have a wall surface cooling function in order to ensure sufficient durability since an inner wall surface thereof is exposed to the combustion gas. The cooling passage RA, RB constitutes a cooling mechanism for sufficiently cooling the combustion chamber 4.

The nozzle skirt 5 is a funnel-shaped injection nozzle that communicates with the combustion room to inject the combustion gas to an outside. The reusable rocket in the present embodiment flies using a reaction force obtained when the combustion gas is injected from the nozzle skirt 5 to the outside as a thrust. Similar to the combustion chamber 4, the nozzle skirt 5 needs to have a wall surface cooling function since an inner wall surface thereof is exposed to the combustion gas. The cooling passage RA, RB constitutes a cooling mechanism for sufficiently cooling the nozzle skirt 5.

Next, a vibration suppression function of the combustor C for the rocket engine according to the present embodiment will be described in detail with reference to FIG. 4.

Figure 4:
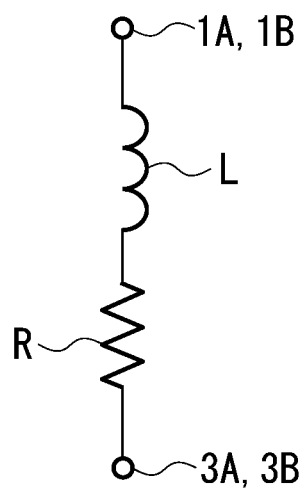
FIG. 4 is a vibration equivalent circuit of a combustor for a rocket engine according to an embodiment of the present disclosure.

First, FIG. 4 is a vibration equivalent circuit (vibration model) of the combustor C for the rocket engine. In the combustor C for the rocket engine, vibration is generated by coupling a pressure fluctuation in the fuel passage 2A (liquid fuel passage) from the fuel receiving portion 1A to the fuel injector 3A, and in the oxidant passage 2B from the oxidant receiving portion 1B to the oxidant injector 3B with a fluctuation of pressure (combustion pressure) in the combustion chamber 4. That is, the combustor C for the rocket engine vibrates due to the circulation of the liquid fuel and the oxidant as one of vibration sources.

The vibration equivalent circuit shown in FIG. 4 shows how each component (mechanical element) of the combustor C for the rocket engine shown in FIG. 1 acts on vibration caused by the vibration sources. That is, the vibration equivalent circuit of the combustor C for the rocket engine is expressed as a series connection circuit of an equivalent inertance L and an equivalent resistance R, and the vibration is suppressed by adjusting a magnitude of the equivalent inertance L or/and the equivalent resistance R.

Here, the equivalent inertance L is expressed by the following equation, which is an amount that depends on the passage lengths of the fuel passage 2A and the oxidant passage 2B. Each parameter in the equation is as shown in Table 1. Furthermore, in the equation, a front equation is an equation showing the equivalent inertance L in a dimensional manner, and a rear equation is an equation showing the equivalent inertance L in a dimensionless manner.

$$L = \frac{\overline{p}l}{A}, L = \frac{\overline{p}l}{A} \cdot \frac{\overline{m}/\overline{p}}{\overline{P_c} \cdot \tau_{stay}}$$

TABLE 1

| | |
|---|---|
| l | PASSAGE LENGTH [m] |
| A | PASSAGE CROSS-SECTIONAL AREA [m$^2$] |
| $\bar{\rho}$ | FLUID DENSITY Mean Value [kg/m$^3$] |
| $\bar{m}$ | MASS FLOW RATE Mean Value [kg/s] |
| $\bar{P_c}$ | COMBUSTION PRESSURE Mean Value [Pa] |
| $\tau_{stay}$ | PROPELLANT STAY TIME IN THE COMBUSTOR [s] |

Furthermore, the equivalent resistance R is an amount that depends on a pressure loss of the liquid fuel and the oxidant in the fuel passage 2A, the oxidant passage 2B, the fuel injector 3A, and the oxidant injector 3B. The equivalent resistance R is an amount that makes it difficult for the combustor C for the rocket engine to vibrate by increasing the resistance and makes it easy for the combustor C for the rocket engine to vibrate by decreasing the resistance.

As shown in the equation, the equivalent inertance L is an amount that tends to increase when a combustion pressure mean value is lowered, and therefore has a property of suppressing vibration in a low thrust. That is, in a case where the equivalent inertance L is optimally set for vibration in the normal thrust, when a thrust of the combustor C for the rocket engine is reduced, the equivalent inertance L increases, so that the combustor C for the rocket engine is in a state where it is difficult to vibrate.

In a normal rocket engine, the pressure loss is a pressure difference (injection differential pressure) between a pressure of the fuel in the fuel injector 3A and a combustion pressure in the combustion chamber 4, and a pressure difference (injection differential pressure) between a pressure of the oxidant in the oxidant injector 3B and a combustion pressure in the combustion chamber 4 and is proportional to the square of mass flow rates of the fuel and the oxidant. In addition, the combustion pressure in the combustion room is proportional to the mass flow rates. Therefore, when the thrust of the combustor C for the rocket engine is reduced, the equivalent resistance R is reduced, such that the combustor C for the rocket engine is likely to vibrate.

In the design concept of a disposable rocket engine in the related art, a thrust range of the disposable rocket engine is narrow, so vibration is suppressed by optimally setting the equivalent resistance in the normal thrust. On the contrary, since the combustor C for the rocket engine according to the present embodiment is mounted and used in a reusable rocket engine, the passage lengths of the fuel passage 2A and the oxidant passage 2B are lengthened to increase the equivalent inertance L, thereby securing a vibration margin in a case where used with a thrust that is relatively significantly reduced from the normal thrust.

According to the present embodiment, the equivalent inertance L in the vibration equivalent circuit of the combustor C for the rocket engine is increased by lengthening the passage lengths of the fuel passage 2A and the oxidant passage 2B, thereby effectively suppressing the vibration of the combustor C for the rocket engine when operating with a plurality of thrusts (operating points) in a relatively wide thrust range.

In addition, according to the present embodiment, since a total cross-sectional area of the plurality of branch pipes 23a, 23b is equal to a cross-sectional area of the single receiving pipes 21a, 21b, the passages of the liquid fuel and the oxidant (the fuel passage 2A and the oxidant passage 2B) can be branched without changing the equivalent resistance R. Therefore, according to the present embodiment, it is possible to consider vibration suppression by focusing only on the equivalent inertance L without considering a change in the equivalent resistance R.

In addition, according to the present embodiment, the passage lengths of the fuel passage 2A and the oxidant passage 2B are lengthened by providing the fuel branch portion 22a in the fuel passage 2A and providing the oxidant branch portion 22b in the oxidant passage 2B, that is, by providing the plurality of branch portions S in the fuel passage 2A and the oxidant passage 2B, thereby increasing the equivalent inertance L. Therefore, according to the present embodiment, it is possible to easily increase the equivalent inertance L.

In addition, according to the present embodiment, since the fuel branch portion 22a is provided in front of the cooling passage RA, and the oxidant branch portion 22b is provided in front of the cooling passage RB, that is, since the plurality of branch portions S are provided in front of the cooling passages RA, RB, it is possible to easily lengthen the passage lengths of the fuel passage 2A and the oxidant passage 2B.

In addition, according to the present embodiment, since the cooling passages RA, RB, that is, the branch pipes 23a, 23b, are folded back at the end portion 5b of the nozzle skirt 5 and are spirally provided with respect to the combustion chamber 4 and the nozzle skirt 5, it is possible to easily lengthen the passage lengths of the fuel passage 2A and the oxidant passage 2B even with such an arrangement of the branch pipes 23a, 23b.

Furthermore, the present disclosure is not limited to the above embodiment, and for example, the following modifications are considered.

(1) In the above embodiment, the fuel branch portion 22a is provided in the fuel passage 2A, and the oxidant branch portion 22b is provided in the oxidant passage 2B, but the present disclosure is not limited thereto. That is, either one of the fuel branch portion 22a or the oxidant branch portion 22b may be provided.

(2) In the above embodiment, a total cross-sectional area of the plurality of branch pipes 23a, 23b is equal to a cross-sectional area of the single receiving pipes 21a, 21b, but the present disclosure is not limited thereto. The fuel passage 2A and the oxidant passage 2B may be branched so as to change passage cross-sectional areas in front of and behind the fuel branch portion 22a and the oxidant branch portion 22b.

(3) In the above embodiment, the branch pipes 23a, 23b are folded back at the end portion 5b of the nozzle skirt 5, but the present disclosure is not limited thereto. The branch pipes 23a, 23b may be folded back at any position between, for example, the upper end of the combustion chamber 4 and the end portion 5b of the nozzle skirt 5.

(4) In the above embodiment, as shown in FIG. 2, one branch portion S is bifurcated, but the present disclosure is not limited thereto. The number of branches in one branch portion S may be three or more.

INDUSTRIAL APPLICABILITY

According to the present disclosure, it is possible to provide a combustor for a rocket engine capable of effectively suppressing vibration when operating with a plurality of thrusts.

What is claimed is:

1. A combustor for a rocket engine comprising:
a combustion room configured to cause a combustion reaction between a fuel and an oxidant, the combustion room being an internal space of a combustion chamber;
an injector configured to inject the fuel and the oxidant into the combustion room;
a nozzle skirt configured to inject combustion gas generated by the combustion reaction to an outside;
an inertance increasing portion configured to increase an equivalent inertance in a vibration equivalent circuit of the combustor for the rocket engine;
a fuel passage configured to guide the fuel to the combustion room, the fuel passage including a plurality of fuel branch pipes and a fuel branch portion including a tournament-type branch form in which a plurality of fuel branch flow paths each of which branching a fuel flow path into two fuel flow paths is sequentially repeated to be arranged in a flow direction of the fuel and configured to distribute the fuel to the plurality of fuel branch pipes; and
an oxidant passage configured to guide the oxidant to the combustion room, the oxidant passage including a plurality of oxidant branch pipes and an oxidant branch portion including a tournament-type branch form in which a plurality of oxidant branch flow paths each of which branching an oxidant flow path into two oxidant flow paths are sequentially repeated to be arranged and configured to distribute the oxidant to the plurality of oxidant branch pipes,
wherein the inertance increasing portion increases the equivalent inertance by providing the fuel branch portion, the oxidant branch portion, the plurality of fuel branch pipes, and the plurality of oxidant branch pipes in the fuel passage and the oxidant passage to lengthen a passage length thereof, and
wherein the plurality of fuel branch pipes and the plurality of oxidant branch pipes are provided on a wall surface of the combustion chamber and the nozzle skirt to be adjacent to each other.

2. The combustor for the rocket engine according to claim 1, wherein the inertance increasing portion branches the fuel passage and the oxidant passage without changing a passage cross-sectional area in front of and behind the fuel branch portion and the oxidant branch portion.

3. The combustor for the rocket engine according to claim 1, wherein the plurality of fuel branch pipes in the fuel passage and the plurality of oxidant branch pipes in the oxidant passage are provided from a base end to an end portion of the nozzle skirt and is folded back at the end portion.

4. The combustor for the rocket engine according to claim 3, wherein the plurality of fuel branch pipes in the fuel passage and the plurality of oxidant branch pipes in the oxidant passage are spirally provided with respect to the nozzle skirt.

5. The combustor for the rocket engine according to claim 1, wherein the plurality of fuel branch pipes in the fuel passage and the plurality of oxidant branch pipes in the oxidant passage are spirally provided with respect to the nozzle skirt.

* * * * *